United States Patent [19]
Ott

[11] Patent Number: 5,559,917
[45] Date of Patent: Sep. 24, 1996

[54] CONNECTOR FOR TERMINATED FIBER OPTIC CABLE

[76] Inventor: Conrad L. Ott, 43 Washburn St., Lake Grove, N.Y. 11744

[21] Appl. No.: 428,293

[22] Filed: Apr. 25, 1995

Related U.S. Application Data

[63] Continuation-in-part of Ser. No. 23,678, Feb. 26, 1993, Pat. No. 5,436,994.

[51] Int. Cl.$^6$ .................. G02B 6/00; G02B 6/36
[52] U.S. Cl. .................................................. 385/86
[58] Field of Search .................. 365/86–89, 62, 365/68, 70, 84, 85

[56] References Cited

U.S. PATENT DOCUMENTS

| | | | |
|---|---|---|---|
| 4,684,205 | 8/1987 | Margolin et al. | 385/69 X |
| 4,687,288 | 8/1987 | Margolin et al. | 385/72 X |
| 5,096,276 | 3/1992 | Gerace et al. | 385/76 |
| 5,113,464 | 5/1992 | Wall | 385/81 |
| 5,136,672 | 8/1992 | Mulholland et al. | 385/53 |

*Primary Examiner*—Akm E. Ullah
*Attorney, Agent, or Firm*—Charles E. Temko

[57] ABSTRACT

A fiber optic connector having a deformable rear end adapted to clamp a terminated fiber optic cable in such manner that the fiber and buffer of the cable are capable of limited axial movement within a surrounding sheath. To prevent the buffer from being clamped, a hollow tubular insert is positioned between the buffer and the sheath. The insert includes an enlarged terminal which radially spreads the strength members surrounding the buffer in a uniform distribution and offers protection from subsequent clamping on the outer surface of the sheath. The enlarged terminal also serves as a stop means when inserted between the buffer and the sheath. The rear body element of the connector is provided with internal threads which surround the cable jacket and strength members which, during a clamping operation, causes the sheath and strength members to deform into the threads for superior cable retention.

5 Claims, 2 Drawing Sheets

CONNECTOR FOR TERMINATED FIBER OPTIC CABLE

RELATED APPLICATION

This application is a continuation-in-part of U.S. patent application Ser. No. 08,023,678 filed Feb. 26, 1993 entitled "Ferrule Holder For Fiber Optic Connector", now U.S. Pat. No. 5,436,994, and assigned to the same assignee as this application.

BACKGROUND OF THE INVENTION

This invention relates generally to the field of optical cable connectors used in the telecommunications industry and more particularly to a type in which the fiber and surrounding buffer are supported in a slidably mounted or "floating" ferrule to enable relative movement between the fiber and buffer and the surrounding jacket of the cable which forms a load supporting part of the cable. This type of construction has come into increased use in recent years because of the ability to absorb external loads on the cable without disturbing the positioning of the end of the fiber, movement of which would otherwise interfere with a transmitted communication carried by the cable.

Connectors of this type are normally substantially fully assembled before permanent engagement with the end of the cable which installation involves the adhesion of the fiber within the ferrule. Care must be exercised to prevent any wicking of the adhesive to other parts of the connector so that the ferrule body will not be frozen in a single position when the adhesive cures. In one known device of this type, an elongated flexible sleeve is provided which communicates at an inner end thereof with the inner end of the ferrule, and in which the outer end extends outwardly of the connector to be severed after the epoxy has been injected therethrough. While effective, this construction provides an additional manufacturing operation, and is somewhat clumsy in operation.

Another problem occurs with the clamping of the rear part of the connector upon the outer jacket of the cable. The clamping action must be secure, but not include the clamping of the buffer or fiber which must be capable of limited axial movement within the jacket as is required with a floating ferrule construction.

This problem has been resolved to some degree in the prior art depending upon the type of fiber optic connector employed with varying degrees of satisfaction. One desired quality which has not been addressed is the ability to rapidly assemble the cable within the receiving part of the connector by crimping a part of the connector without restricting the necessary limited axial movement, to thereby materially simplify assembly and reduce the cost of manufacture of the connector.

In the provision of the clamping action, it is desirable to flare the elongated strength members of the cable in a uniformed distribution (as opposed to such strength members being gathered into a bunch at one side) which results in improved retention of the strands within the rear body of the connector housing after the same is deformed to retain the cable end within the housing.

SUMMARY OF THE INVENTION

Briefly stated, the invention contemplates the provision of improved fiber optic connectors of the class described, in which the above-mentioned disadvantages and requirements have been substantially addressed and complied with.

To this end, the rear body of the connector which engages the jacket of the cable may take any of several alternative forms, one of which includes a collet type clamp which grips the jacket firmly without damaging the buffer. Another form includes the provision of internal threads in the rear body into which the outer surface of the jacket is deformed upon crimping. In the latter case, the buffer is protected by the provision of a metal tube which is inserted between the buffer and the surrounding strength members which resists the crimping action. The tube is provided with an enlarged terminal at one end thereof which, upon the insertion of the tube, acts to uniformly radially spread the strength members so that they may be uniformly positioned on the outer surface of the sheath for subsequent crimping thereupon. This enlarged terminal also acts as a stop means by seating against the cable jacket when fully inserted.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
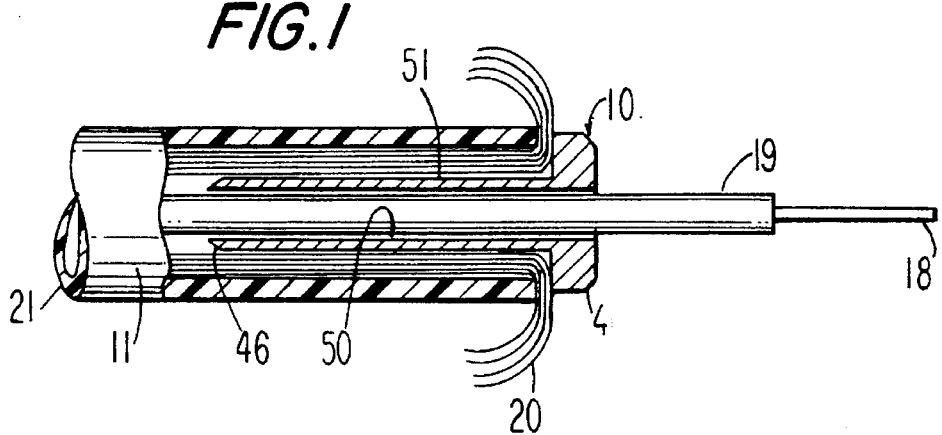
FIG. 1 is a fragmentary sectional view of an embodiment of the invention with a component part removed for purposes of clarity.

In accordance with the invention, the device, generally indicated by reference character 10 is illustrated in conjunction with a known fiber optic cable 11 and rear body 12 of a fiber optic connector, the details of which are disclosed in the above-mentioned copending application, which are incorporated by reference.

The fiber optic cable 11 may be any of a variety of types, all of which include a concentrically positioned glass fiber 18 and surrounding polymer buffer 19. Surrounding the buffer are a plurality of axially aligned parallel stranded strength members 20 most commonly formed of material sold under the trademark KEVLAR. Surrounding the strength members is a synthetic resinous sheath 21.

The rear body 12 includes an inner end (not shown) which engages the main body of the connector, and an outer end portion 29 which projects from an enlarged portion 30 to include a hollow sleeve 31 bounded by an outer edge 32, the sleeve including a threaded segment 33, an unthreaded segment 34, and a bore 35. It is bounded by an outer cylindrical surface 36 and includes an area of thinned cross section 37 which separates a crimpable portion 38 from an uncrimped portion 39. Rigidity is imparted to the portion 39 by a radially extending flange 40.

As best seen in FIG. 1, the device 10 comprises a hollow headed tube including an elongated shank portion 46 and an enlarged terminal 47, the outer diameter of which enables it to abut an exposed end edge of the sheath 21. Once assembled, the terminal 47 abuts a conical interconnecting bore 49 in the rear body 12 which maintains it in position.

Again, as best seen in FIG. 1, the shank portion 46 has an inner diameter 50 which provides clearance for the outer surface of the buffer 19. Once positioned, the outer surface 51 underlies the strength members 20 beneath the sheath 21 which is slightly distorted to form an interstice in which the shank is disposed.

Assembly proceeds as indicated in the drawings. As is known in the art, a portion of the sheath (21) is first removed to expose the strength members 20 and the buffer 19. A portion of the buffer (19) is also removed to permit the fiber 18 to be positioned within a ferrule.

When in this condition, the device 10 is inserted between the strength members and the buffer by slightly distorting the sheath to a point where the terminal 47 contacts the end of the sheath. During this operation, the strength members are fanned out radially and substantially equally to enable the same to be folded upon the outer surface of the sheath (when subsequently inserted into the structure shown in FIG. 2) as indicated in FIG. 3.

Figure 2:
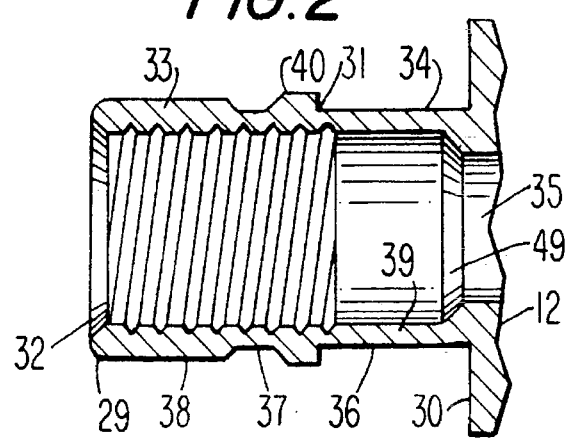
FIG. 2 is a longitudinal sectional view of the removed component part.
Figure 3:
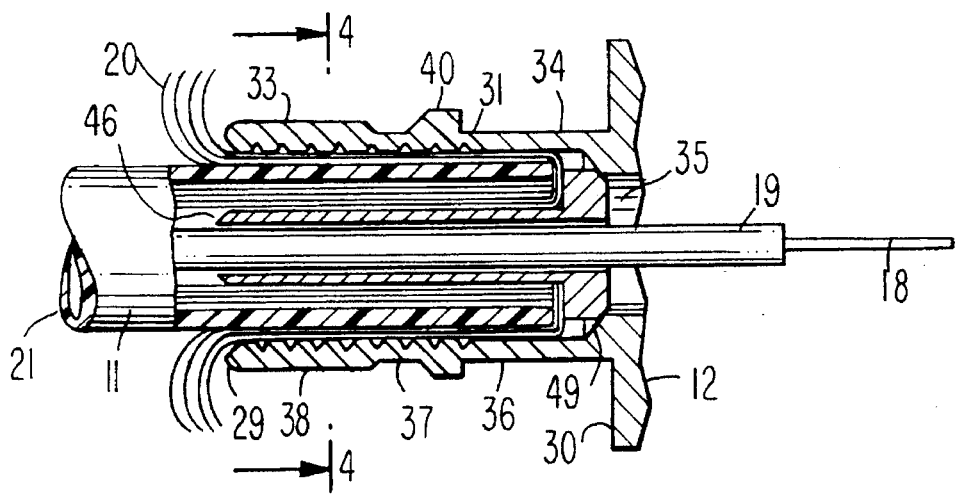
FIG. 3 is a fragmentary longitudinal sectional view showing the assembly of the parts shown in FIGS. 1 and 2.
Figure 4:
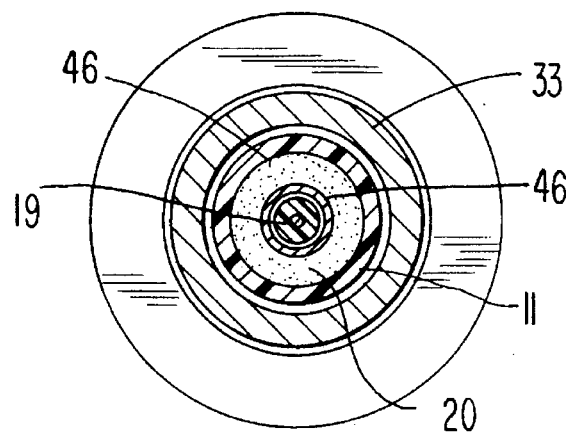
FIG. 4 is a transverse sectional view as seen from the plane 4—4 in FIG. 3.
Figure 6:
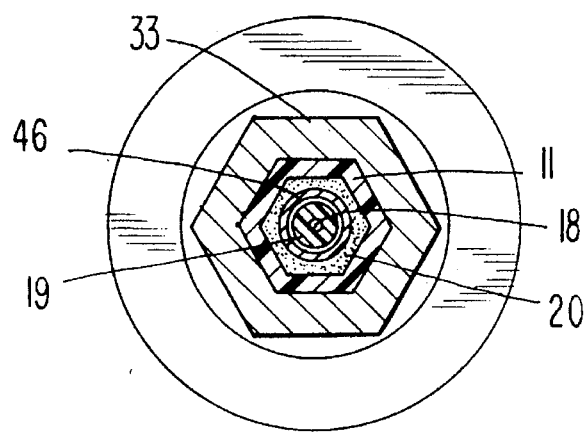
FIG. 6 is a transverse sectional view as seen from the plane 6—6 in FIG. 5.
Figure 5:
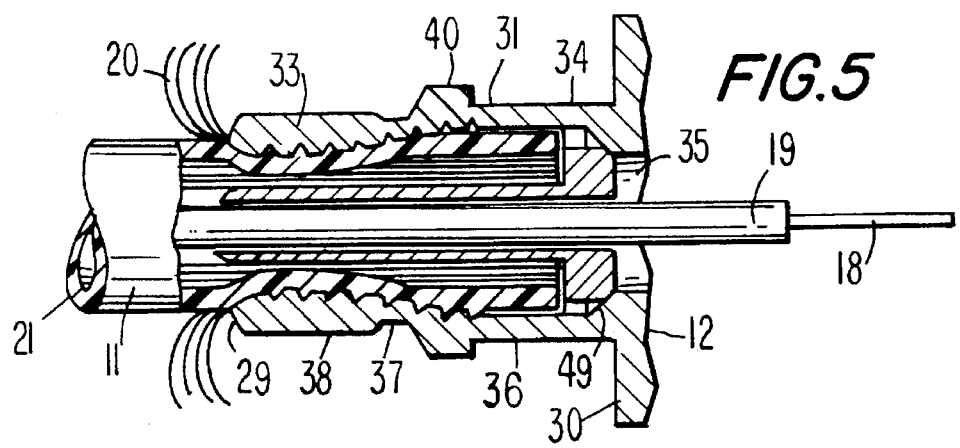
FIG. 5 is a fragmentary longitudinal sectional view corresponding to that seen in FIG. 3 but showing a subsequent crimping operation.

Next, the structure of FIG. 1 is inserted into the structure of FIG. 2, inward positioning being limited by the engagement of the terminal 47 with the transitional portion 49 leading to the bore 35. In a final step, the crimpable portion 38 which includes the threaded segment 33 is hexagonally crimped as seen in FIG. 6 upon the underlying portion of the sheath and strength members to a point where the same is compressed on the outer surface of the shank portion 46, during which time the threads are distorted into the strength members and the body of the sheath to provide an interlocking engagement. The extent of crimping action is carefully controlled, and the presence of the shank portion 46 prevents the transmission of crimping force to the buffer 19 thus enabling the same to retain a degree of limited axial movement relative to the sheath when the rear body 12 is assembled with the connector as shown in the above-mentioned copending application.

It may thus be seen that by the provision of a relatively simple expedient, it is possible to materially simplify the manufacture of the connector and enable engagement of the end of the cable within the rear body using a simple crimping technique which eliminates the need for a collet type clamp and accompanying clamping nut. By employing a headed sleeve inserted into the interstice between the buffer and the strength members, the buffer is effectively shielded from the crimping action to retain relatively limited axial movement capability relative to the sheath, with the headed portion of the sleeve obtaining a uniform radial spreading of the strength members for subsequent clamping against the sheath and headed sleeve during the crimping operation.

It is to be understood that it is not considered that the invention is limited to the precise details of structure shown and set forth in the specification, for obvious modifications will occur to those skilled in the art to which the invention pertains.

What is claimed is:

1. In a combination of a terminated fiber optic cable and connector therefor, the connector including a rear body element having a hollow tubular body into which said fiber optic cable is inserted, said fiber optic cable including a glass fiber and surrounding polymer buffer, plural longitudinally aligned strength members surrounding said buffer, and a synthetic resinous sheath surrounding said strength members; said rear body including a deformable tubular sleeve having a first through bore of first diameter, and a counter bore of second diameter, said cable having a length of sheath removed to expose said strength members, the improvement comprising: an elongated hollow sleeve having an enlarged terminal at one end thereof, having an internal diameter which provides clearance for said buffer, said sleeve being inserted coaxially into said cable at a first end thereof between said strength members and said buffer to a point where said terminal engages an exposed end of said sheath, said terminal radially spreading said strength members to be folded upon an outer surface of said sheath subsequent to insertion of said cable into said deformable sleeve of said body; said sleeve of said rear body being crimped upon said sheath and strength members to compress said sheath and strength members upon said elongated hollow sleeve, said hollow sleeve preventing compression of said buffer to allow relative movement of said buffer relative to said rear body and said sheath.

2. The improvement in accordance with claim 1 in which said sleeve of said rear body includes internal threads which are deformed into the body of said sheath.

3. The improvement in accordance with claim 1 in which said terminal of said elongated hollow sleeve engages a constricted part of said rear body to be maintained in position.

4. The method of preventing constriction upon the buffer of a terminated fiber optic cable having a surrounding sheath and a plurality of stranded strength members disposed thereabout upon engagement with a fiber optic connector, and the crimping of a part of the connector upon the cable comprising the steps of:

a) preparing the cable by removing a length of the sheath adjacent the end of the cable to expose the strength members;

b) providing an elongated hollow sleeve having a through bore which provides clearance for the outer diameter of said buffer and an enlargement at a first end thereof;

c) inserting a second opposite end of said elongated hollow sleeve into the cylindrical interstice between the outer surface of said buffer and said strength members to radially deflect said strength members to a point where said enlargement contacts a free exposed end of said sheath;

d) inserting said cable into said fiber optic connector and;

e) deforming a part of said connector to compress said sheath and strength members upon said elongated hollow sleeve.

5. In a fiber optic connector having a rear body including means for engaging the sheath and folded back strands of a fiber optic cable, the improvement comprising: said rear body including a deformable segment defining an internally threaded bore of first diameter, said cable sheath and folded back strands of said strength members forming a second diameter of less than that of said first diameter to be slidably engaged therein; said segment being crimped thereafter to deform said sheath and strength members into the interstices of said internally threaded bore to be retained thereby.

* * * * *